United States Patent [19]

Kikugawa

[11] Patent Number: 5,164,650
[45] Date of Patent: Nov. 17, 1992

[54] CONTROL DEVICE FOR STEPPING MOTOR

[75] Inventor: Noriyuki Kikugawa, Kanagawa, Japan

[73] Assignee: Canon Kabushiki Kaisha, Tokyo, Japan

[21] Appl. No.: 540,289

[22] Filed: Jun. 19, 1990

[30] Foreign Application Priority Data

Jul. 12, 1989 [JP] Japan .................................. 1-178091

[51] Int. Cl.⁵ ............................................. H02P 8/00
[52] U.S. Cl. .................................... 318/696; 363/132
[58] Field of Search ................. 318/696, 685; 363/132

[56] References Cited

U.S. PATENT DOCUMENTS

| 3,247,447 | 4/1960 | Flairty | 363/58 |
| 3,728,598 | 4/1973 | May | 318/696 |
| 4,412,166 | 10/1983 | Crider et al. | 318/696 |
| 4,423,366 | 12/1983 | Gottwald | 318/696 |
| 4,692,679 | 9/1987 | Hujita | 318/696 |
| 4,799,002 | 1/1989 | Matsumoto | 318/696 |

Primary Examiner—William M. Shoop, Jr.
Attorney, Agent, or Firm—Fitzpatrick, Cella Harper & Scinto

[57] ABSTRACT

A control device for driving a stepping motor having a plurality of coils is provided with timing control means for inserting a quiescent time into a phase signal for actuating energization of the coils.

2 Claims, 5 Drawing Sheets

CONTROL DEVICE FOR STEPPING MOTOR

BACKGROUND OF THE INVENTION

1. Field of the Invention

This invention relates to control devices for a motor.

2. Description of the Related Art

The prior known bipolar drive method is exemplified in FIG. 5 where only the circuit for driving one coil L1 of the stepping motor is shown. An input signal DIR for changing over the direction of a current flowing to the coil is supplied to buffers G51 and G54 and inverters G52 and G53. The outputs of the buffers and inverters G51-G54 are supplied through resistors R51-R54 to the bases of transistors Tr51-Tr54 respectively. The transistors Tr51 and Tr52 are of NPN type, their emitters being grounded and their collectors being connected to the respective ends of the coil $L_1$. The transistors Tr53 and Tr54 are of PNP type, their emitters being connected to an electric power source Vcc and their collectors being connected to the respective ends of the coil $L_1$. (The transistor Tr54 is connected to the collector side of the transistor Tr51 and the transistor Tr53 is connected to the collector side of the transistor Tr52.)

Now assuming that the level of the signal DIR is high, then the transistors Tr51 and Tr53 are biased by the buffer and inverter G51 and G53, being in a conducting state. Suppose, at this time, the signal DIR has changed to low level, then the transistors Tr52 and Tr54 are biased to come into a conducting state by the inverter and buffer G52 and G54, while the transistors Tr51 and Tr53 simultaneously come into a non-conducting state. Here, no problem will arise if the conduction of the transistors Tr52 and Tr54 starts after the transistors Tr51 and Tr53 have completely come into a non-conducting state. In fact, it is before the transition of either or both of the transistors Tr51 and Tr53 to a non-conducting state is completed that the transistors Tr52 and Tr54 come into a conducting state. Therefore, it happens, though for a moment, that a through-current flows in a route: the power source Vcc→transistor Tr54→the transistor Tr51→the ground, or the power source Vcc→the transistor Tr53→the transistor Tr52→the ground.

Thus, the conventional type has a drawback that, when the direction of a driving current supplied to the stepping motor is changed over, an unnecessary current is allowed to flow to the driver, so that heat is generated therein and an unnecessary surplus of the load is given to the electric power source.

SUMMARY OF THE INVENTION

With the foregoing in mind, it is, therefore, an object of the present invention to provide a control device for the stepping motor, which adequately controls the on-/off operation of the driving transistors in such a manner that the unnecessary consumption of energy is limited to a minimum.

To achieve this object, according to the invention, a control device for driving a stepping motor having a plurality of coils is provided with timing control means for inserting a quiescent period into a phase signal for actuating energization of the coils.

Alternatively, a control device for driving a stepping motor having a plurality of coils is provided with oscillating means of a predetermined frequency, latch means for holding a phase signal for changing over the phase of excitation of the stepping motor in synchronism with an output of the oscillating means, and computing means receptive of the phase signal and an output signal of the latch means, for applying a predetermined computing operation to them.

More alternatively, a motor control device for driving a stepping motor having a plurality of coils is provided with oscillating means of a predetermined frequency, first latch means for holding a phase signal for changing over the phase of excitation of the stepping motor in synchronism with an output of the oscillating means, second latch means for holding an output of the first latch means in synchronism with the output of the oscillating means, and computing means, receptive of an output signal of the first latch means and an output signal of the second latch means, for applying a predetermined computing operation to them.

According to the invention, by inserting the quiescent period into the phase signal for driving the stepping motor, it is possible to lower the heat generated by the driving transistors and reduce the load on the electric power source.

DETAILED DESCRIPTION OF THE PREFERRED EMBODIMENTS

Figure 1:
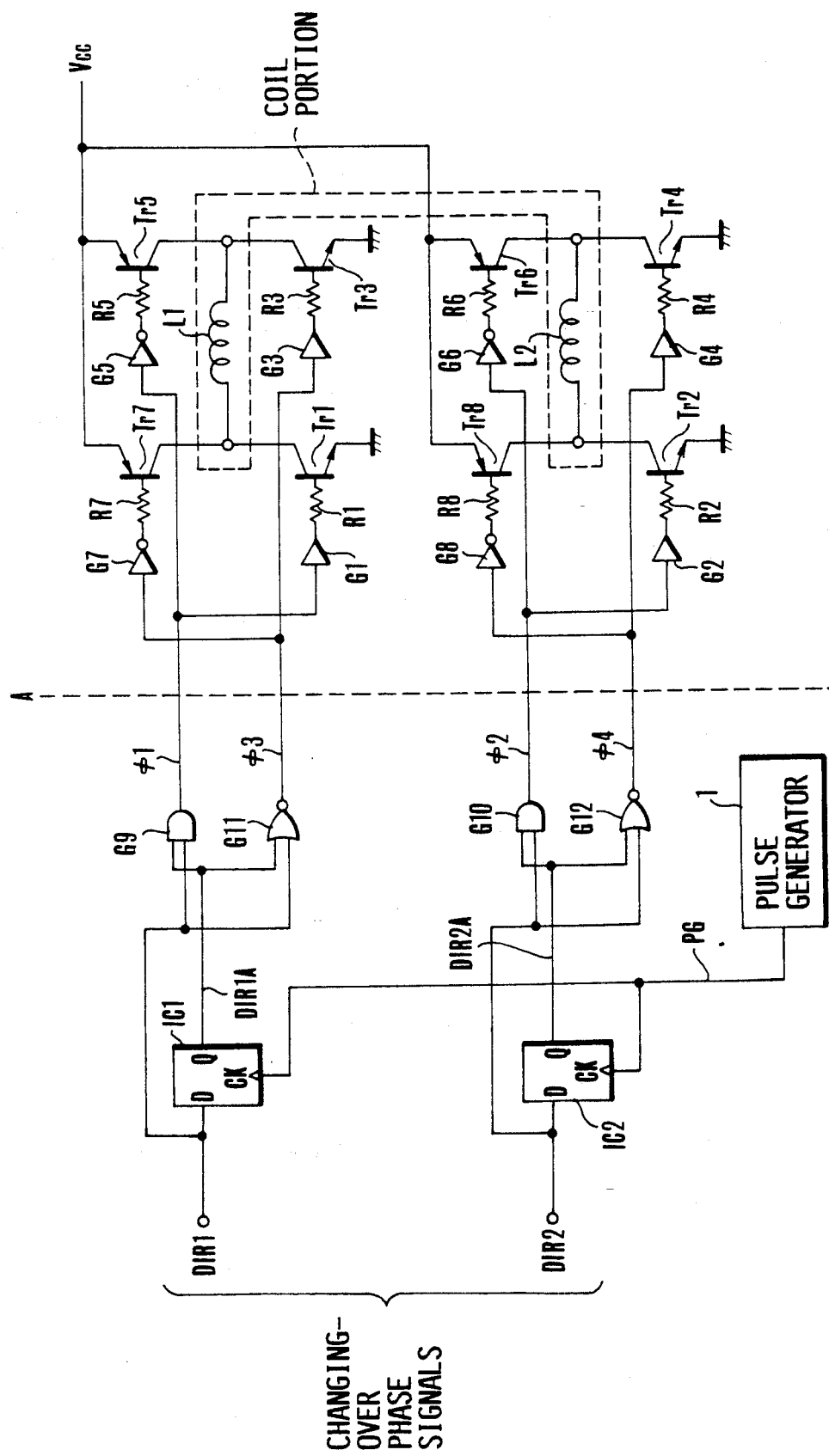
FIG. 1 is an electric circuit diagram illustrating an embodiment of the invention.

FIG. 1 in electric circuit diagram shows a first embodiment of the invention. This embodiment is to drive the stepping motor having two coils $L_1$ and $L_2$ (driving coils) enclosed within a dashed line block. Reference characters DIR1 and DIR2 denote signals for changing over the direction of a current flowing to the coils $L_1$ and $L_2$ (phase signals). The phase signal DIR1 is supplied to a D-input terminal of a D-type flip-flop IC1, one of two input terminals of an AND gate G9, and one of two input terminals of a NOR gate G11. The other phase signal DIR2 is supplied to a D-input terminal of another D-type flip-flop IC2, one of two input terminals of another AND gate G10, and one of two input terminals of another NOR gate G12. In synchronism with the output of a pulse generator 1 supplied to their clock input terminals CK, the flip-flops IC1 and IC2 latch the signals DIR1 and DIR2 supplied to the D-input terminals, and output the latched signals from their Q-output terminals. The Q-output terminals of the flip-flops IC1 and IC2 are respectively connected to the input terminals of the gates G9 and G11 and to the input terminals of the gates G10 and G12.

The output terminals of the gates G9-G12 are respectively connected to the input terminals of a buffer G1 and an inverter G5, the input terminals of another buffer G2 and another inverter G6, the input terminals of another buffer G3 and another inverter G7, and the input terminals of another buffer G4 and another inverter G8. The output terminals of the buffer and inverters G1-G8 are respectively connected through resistors R1-R8 to the bases of transistors Tr1-Tr8.

Here, the emitters of the NPN transistors Tr1-Tr4 are grounded, and the emitters of the PNP transistors Tr5-Tr8 are connected to an electric power source Vcc. Further, the collector of the transistor Tr1 is connected to the collector of the transistor Tr7 and also to one end of the coil $L_1$. The collector of the transistor Tr3 is connected to the collector of the transistor Tr5 and also to the other end of the coil $L_1$. The collector of the transistor Tr2 is connected to the collector of the transistor Tr8 and also to one end of the coil $L_2$. The collector of the transistor Tr4 is connected to the collector of the transistor Tr6 and also to the other end of the coil $L_2$.

The operation of the control device of such a construction is described in detail below.

Figure 2:
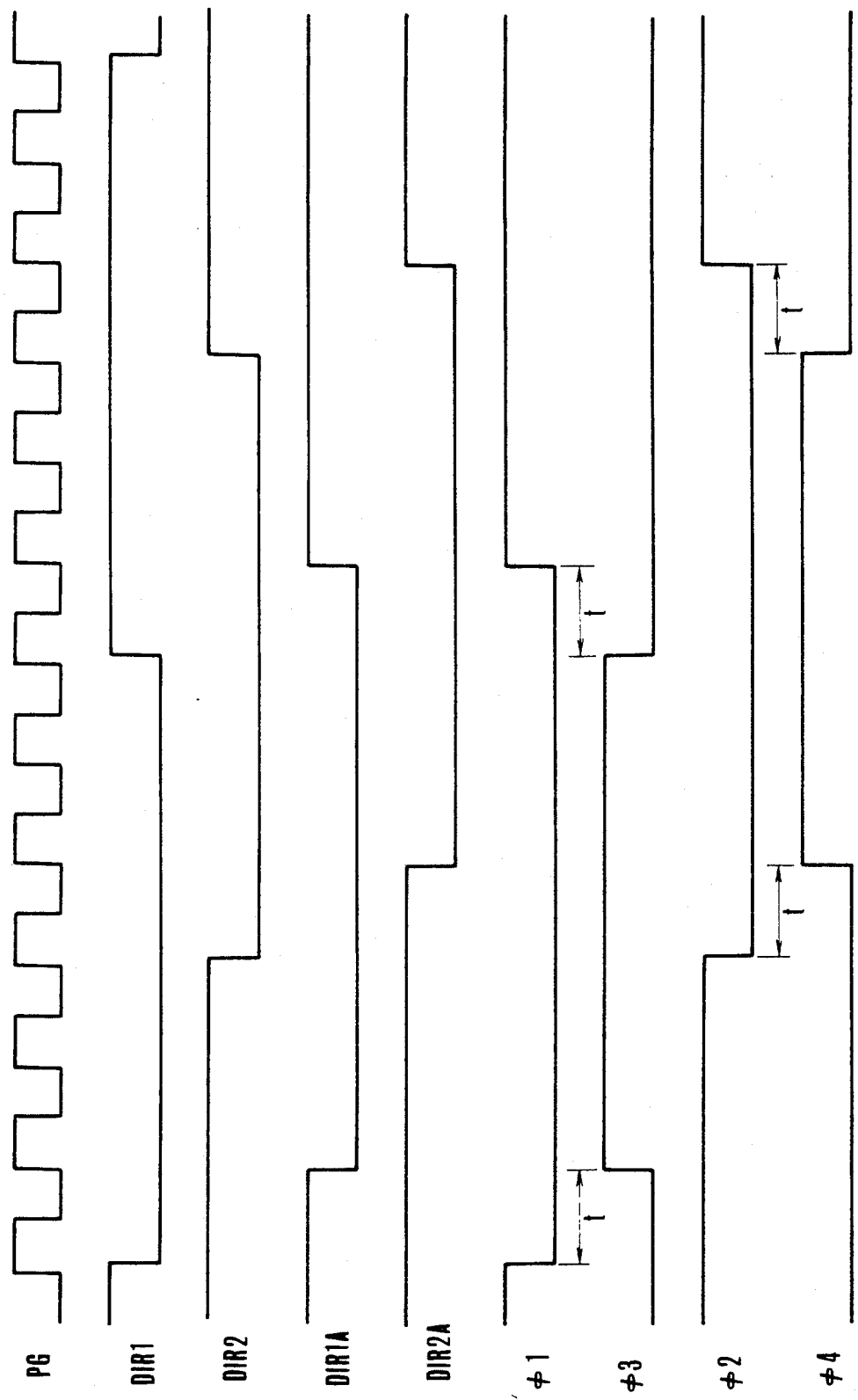
FIG. 2 is a timing chart illustrating a manner in which the device of FIG. 1 operates.

FIG. 2 is a timing chart illustrating the timing of operations of the various portions of the circuit of FIG. 1. Here, an example of application to a type of stepping motor which is driven by 2-phase excitation is taken. In FIG. 2, a signal PG is an output signal of the pulse generator 1. Signals DIR1A and DIR2A are Q-outputs of the flip-flops IC1 and IC2 respectively. Signals $\phi 1-\phi 4$ are output signals of the gates G9-G12 respectively. The phase signals DIR1 and DIR2 are delayed by the flip-flops IC1 and IC2 and caused to vary in synchronism with the rising edge of the signal PG, so that the signals DIR1A and DIR2A are formed.

When the signals $\phi 1-\phi 4$ are at a high level, the coils of the stepping motor are energized. In more detail, when the signal $\phi 1$ is at a high level, the transistor Tr1 is biased by the buffer G1, and the transistor Tr5 is biased by the inverter G5. Hence, both the transistors Tr1 and Tr5 come into a conducting state. As a result, a coil current flows through the coil $L_1$ to the left in a route: the electric power source Vcc→the transistor Tr5→the coil $L_1$→the transistor Tr1→the ground.

Similarly, when the signal $\phi 2$ is at a high level, the transistors Tr2 and Tr6 come into a conducting state, so that a leftward current flows through the coil $L_2$; when the signal $\phi 3$ is at a high level, the transistors Tr3 and Tr7 come into a conducting state, so that a rightward current flows through the coil $L_1$; and when the signal $\phi 4$ is at a high level, the transistors Tr4 and Tr8 come into a conducting state, so that a rightward current flows through the coil $L_2$. It is to be noted here that the signals $\phi 1-\phi 4$ are formed by the following operations:

$\phi 1 = DIR1 \cdot DIR1A$
$\phi 2 = DIR2 \cdot DIR2A$
$\phi 3 = \overline{DIR1} \cdot \overline{DIR1A} = \overline{DIR1 + DIR1A}$
$\phi 4 = \overline{DIR2} \cdot \overline{DIR2A} = \overline{DIR2 + DIR2A}$ Hence, they have such wave forms as shown in FIG. 2. That is, every time the signal DIR1 changes its level, a period t for which both the signals $\phi 1$ and $\phi 3$ at a low level occurs. As a result, all of the transistors Tr1, Tr3, Tr5 and Tr7 come into a non-conducting state. Thus, every time the direction of a current flowing through the coil L1 is reversed, the period t for which the coil $L_1$ is not driven takes place. Similarly, the change of the signal DIR2 is followed by occurrence of a period t for which all of the transistors Tr2, Tr4, Tr6 and Tr8 are in a non-conducting state.

As has been described above, the introduction of a time for which energizing of the coil of the stepping motor is stopped in response to every event of reversing the direction of a current flowing to the coil leads to a possibility of perfectly preventing occurrence of a through-current from the electric power source to the ground, which would otherwise prevail when the phase is changed over.

While the first embodiment has been described in connection with the type of using two phase signals (DIR1 and DIR2) in changing over between the two directions of a current, a second embodiment to be described below is applied to another type which uses four phase signals. Also, in the first embodiment, for a phase error of the signals DIR1 and DIR2 from the output signal PG of the pulse generator 1, there is some possibility of failing to keep constant the time of stopping the coil from being energized. In the resent embodiment, on the other hand, a countermeasure for that is made. This second embodiment is shown in FIG. 3.

Figure 3:
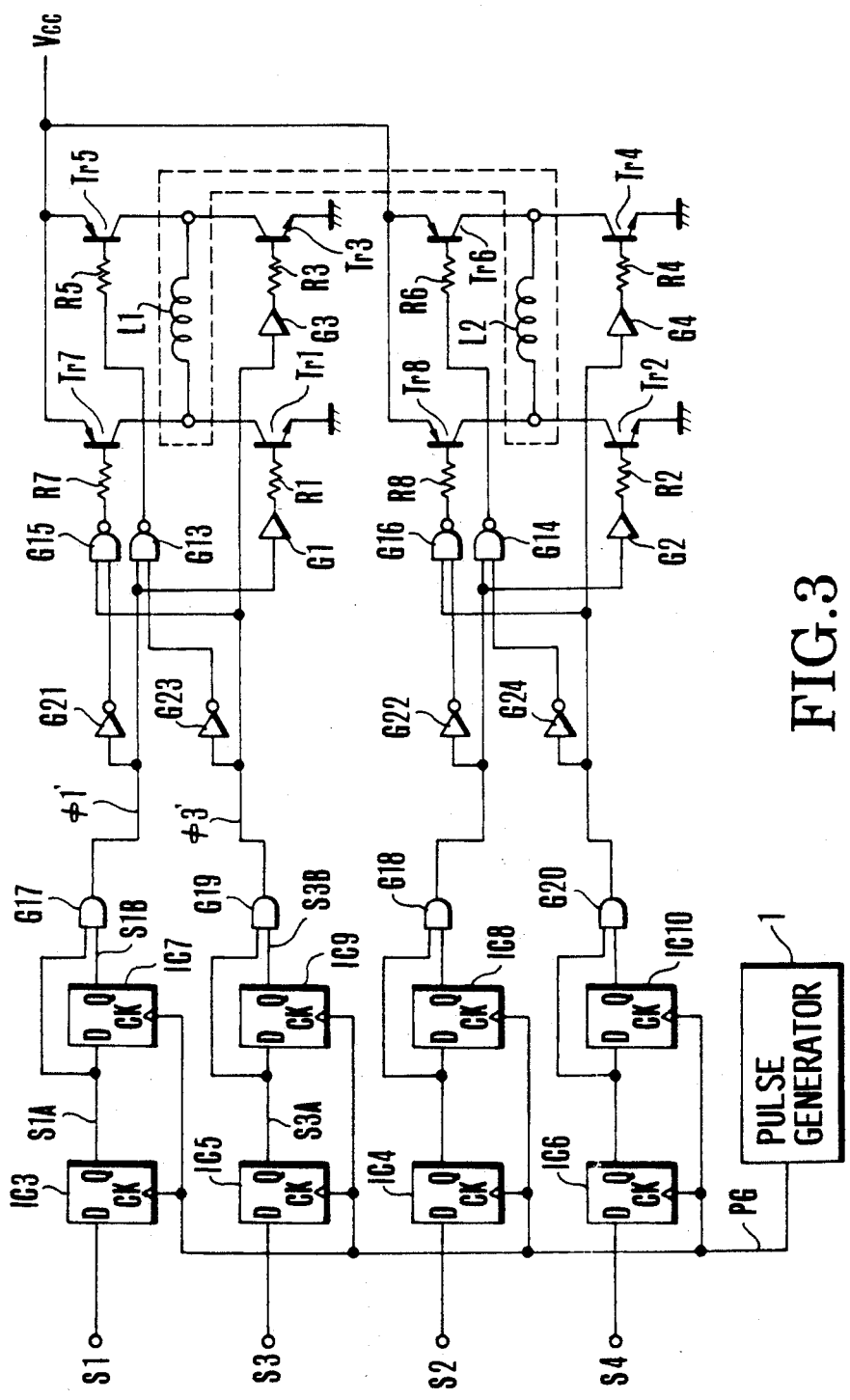
FIG. 3 is an electric circuit diagram illustrating another embodiment of the invention.

In FIG. 3, the elements labeled the same numerals as those of FIG. 1 are the same elements as those shown in FIG. 1. Phase signals S1-S4 are supplied to the D-input terminals of flip-flops IC3-IC6 respectively. The Q-outputs of the flip-flops IC3-IC6 are connected respectively to the D-input terminals of flip-flops IC7-IC10 and also to the inputs of AND gates G17-G20. The other input terminals of the AND gates G17-G20 are connected to the Q-outputs of the flip-flops IC7-IC10 respectively. The output signal PG of the pulse generator 1 is supplied to the clock input terminals CK of the flip-flops IC3-IC10.

The output signals of the AND gates G17-G20 are equivalent to the signals $\phi 1-\phi 4$ of the first embodiment respectively. So, the right hand portion of the circuit of FIG. 1 with the boundary shown by a dashed line may instead be brought into connection with the output stage of the AND gates G17-G20. In this case, however, it will happen that when the signals S1 and S3, for example, both have come into an actuating state, all of the four transistors Tr1, Tr3, Tr5 and Tr7 are rendered conductive, causing the electric power source to be short-circuited to the ground. On this account, in the present embodiment, the inverters G5-G8 of FIG. 1 are replaced and gates G13-G16 and inverters G21-G24 are added. These different parts are connected in the following ways.

The output terminals of the AND gates G17-G20 are respectively connected to the input terminals of the inverters G21-G24, the inputs terminals of NAND gates G13-G16, and the input terminals of buffers G1-G4. The output terminals of the inverters G21-G24 are respectively connected to the other input terminals of the NAND gates G15, G16, G13 and G14. The output terminals of the NAND gates G13-G16 are connected to ends of resistors R5-R8 respectively.

The operation of the circuit of such a construction is described below. The following description is made about only the first coil $L_1$. As for the second coil $L_2$, because of being quite equivalent, its description is omitted.

Figure 4:
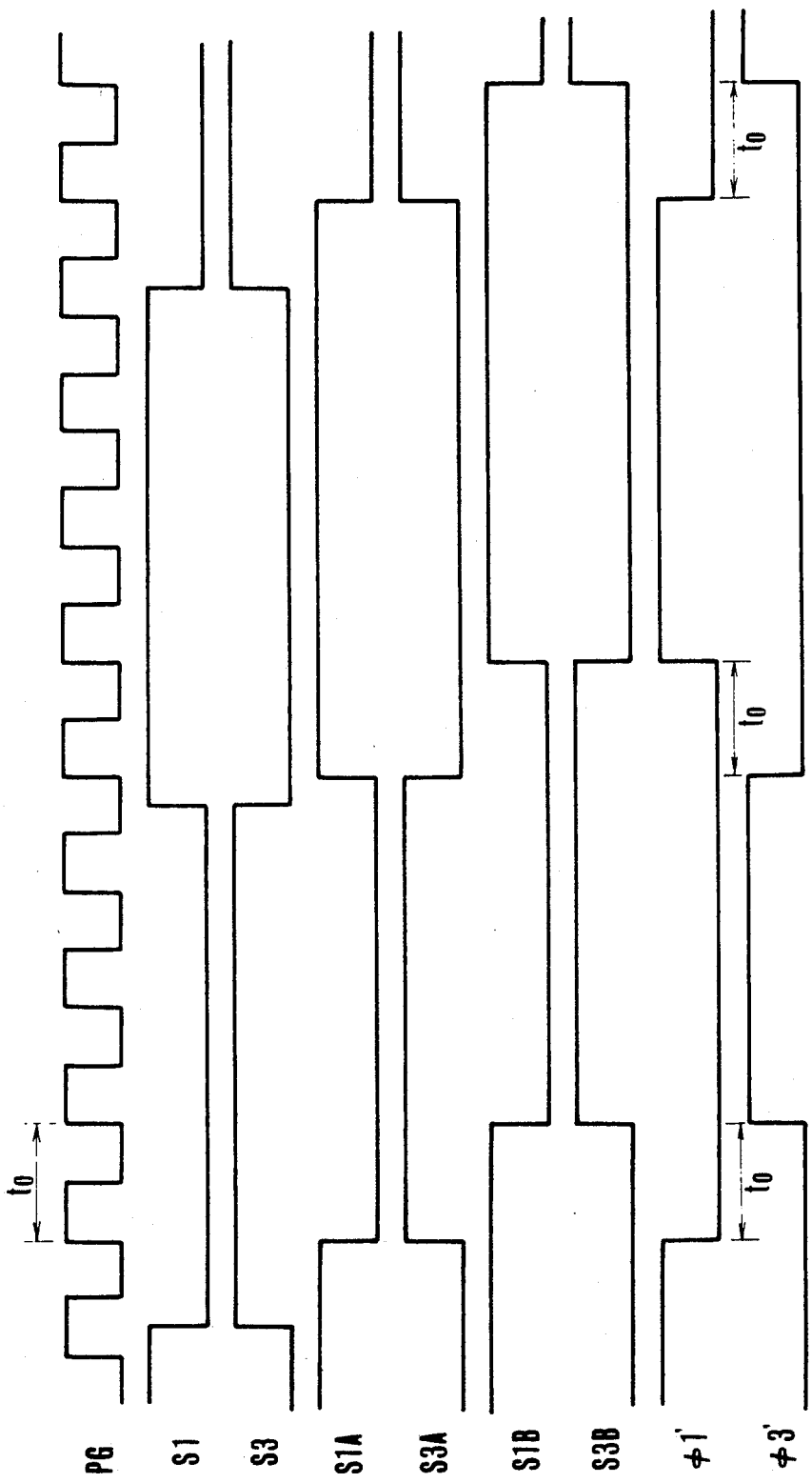
FIG. 4 is a timing chart illustrating a manner in which the device of FIG. 3 operates.
Figure 5:
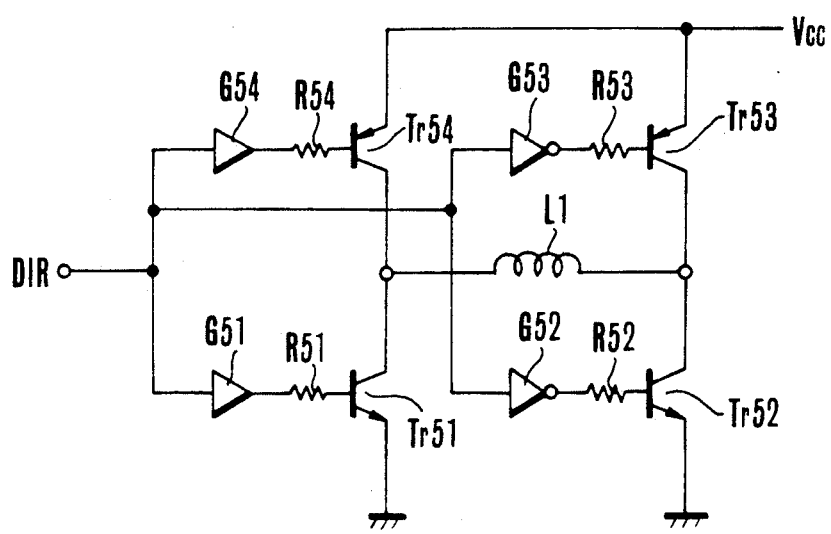
FIG. 5 is a diagram for explaining the conventional example.

FIG. 4 shows a timing relation in which the second embodiment operates. In the figure, S1A and S3A represent the Q-outputs of the flip-flops IC3 and IC5 respectively. S1B and S3B represent the Q-outputs of the flip-flops IC7 and IC9 respectively. $\phi 1'$ and $\phi 3'$ represent the output signals of the AND gates G17 and G19 respectively.

The phase signals S1 and S3 are first synchronized to the output signal PG of the pulse generator 1 by the flip-flops IC3 and IC5, so that signals S1A and S3A are formed. The point of change of the signals S1A and S3A is thus brought into synchronism with the rising of the signal PG. The signals S1A and S3A are then delayed by one clock of the signal PG by the flip-flops IC7 and IC9, so that signals S1B and S3B are formed. The logical product of the signals S1A and S1B and the logical product of the signals S3A and S3B become signals $\phi 1'$ and $\phi 3'$ respectively, which, as are understandable from FIG. 4, have their points of change synchronized with the signal PG, and, in changing the phase, both the signals $\phi 1'$ and $\phi 3'$ come into a deactuating state for a period of time corresponding to one clock ($=t_0$) of the signal PG. As a result, all of the transistors Tr1, Tr3, Tr5 and Tr7 are rendered non-conductive for the time $t_0$ every time the direction of the electric current flowing through the coil $L_1$ is reversed.

Let us consider here the function of the gates G13, G15, G21 and G23. In the case of such an example as shown in FIG. 4, that is, when either one of the signals S1 and S3 is in the actuating state, nothing particular takes place. Hence, the operation is performed in a similar manner to that described in connection with the circuit on the right side of the dashed line A of FIG. 1. But, in an alternative event that both the signals S1 and S3 come into the actuating state at the same time, both the signals $\phi 1'$ and $\phi'$ that are supplied to these gates come into the actuating state, too. To prevent this from leading to flow of the aforesaid through-current, the output signals of the gates G13 and G15 are changed to high level so that the transistors Tr5 and Tr7 are rendered non-conductive. For this purpose, the gates G13, G15, G21 and G23 are used.

Now assuming that the stepping motor is energized by 2-phase excitation with 4000 pps (pulses/sec.), the signal S1 or S3 has a frequency of 1000 Hz, (because the stepping motor rotates 4 steps during each cycle of the signal S1.) Also, because the transistor Tr1, Tr3, Tr5 or Tr7 that drives the coil L1 has a switching time of 2 to 3 $\mu$sec., when the quiescent time $t_0$ to be used is determined to be 5 $\mu$sec. ($>2-3$ $\mu$sec.), the signal PG should have 200 KHz. That is, the time for which the signal S1 is in the actuating state is $1/(1000\ Hz \times 2) = 500$ $\mu$sec. Ignoring the discrepancy between the phases of the signals PG and S1, the actuating time for the signal $\phi 1'$ becomes 500 $\mu$sec. $-t_0 = 495$ $\mu$sec.. This actuating time accounts for 99% of the original phase signal S1. From this, it is apparent that the introduction of the quiescent time in driving the coil L1 gives almost no influence. As the frequency of the driving pulses of the stepping motor lowers, the influence of the quiescent time decreases.

As has been described above, in the present invention, an arrangement of inserting the prescribed quiescent time into the phase signal for driving the stepping motor is employed. Therefore, it becomes possible to prevent the through-current (from the electric power source to the ground) of the coil driving transistor from occurring when the stepping motor is driven. This produces an advantage that the heat generated in the driving transistor can be lowered and the load on the electric power source can be reduced.

What is claimed is:

1. A bipolar control device for bipolar driving of a stepping motor having a plurality of coils, comprising:
   oscillating means arranged to oscillate with a predetermined frequency;
   latch means for holding a phase signal for changing over an excitation phase of the stepping motor in synchronism with an output of said oscillating means; and
   means, in response to receiving the phase signal and an output of said latch means, for applying a predetermined computing operation to the phase signal and the output of said latch means.

2. A bipolar control device for bipolar driving of a stepping motor having a plurality of coils, comprising:
   oscillating means arranged to oscillate with a predetermined frequency;
   first latch means for holding a phase signal for changing over an excitation phase of the stepping motor in synchronism with an output of said oscillating means;
   second latch means for holding an output of said first latch means in synchronism with the output of said oscillating means; and
   means, in response to receiving the output signal of said first latch means and an output signal of said second latch means, for applying a predetermined computing operation to the outputs of said first and second latch means.

* * * * *

UNITED STATES PATENT AND TRADEMARK OFFICE
CERTIFICATE OF CORRECTION

PATENT NO. : 5,164,650
DATED : November 17, 1992
INVENTOR(S) : NORIYUKI KIKUGAWA It is certified that error appears in the above-indentified patent and that said Letters Patent is hereby corrected as shown below:

On the title page, Item [75]:
"Kanagawa" should read --Yokohama--.

IN THE REFERENCES CITED [56]

U.S. PATENT DOCUMENTS
Line 3, "3,247,447 4/1960 Flairty" should read "3,247,447 4/1966 Flairty--.

ATTORNEY, AGENT, OR FIRM
"Fitzpatrick, Cella Harper & Scinto" should read --Fitzpatrick, Cella, Harper & Scinto"--.

COLUMN 1
Line 6, "motor." should read --stepping motor.--.

COLUMN 4
Line 12, "resent" should read --present--.

UNITED STATES PATENT AND TRADEMARK OFFICE
CERTIFICATE OF CORRECTION

PATENT NO. : 5,164,650
DATED : November 17, 1992
INVENTOR(S) : NORIYUKI KIKUGAWA It is certified that error appears in the above-indentified patent and that said Letters Patent is hereby corrected as shown below:

<u>COLUMN 5</u>
 Line 23, "$\phi'$" should read --$\phi 3'$--.

Signed and Sealed this

Fourteenth Day of December, 1993

Attest:

BRUCE LEHMAN

Attesting Officer       Commissioner of Patents and Trademarks